United States Patent [19]
Andrews et al.

[11] 3,912,418
[45] Oct. 14, 1975

[54] LUBRICATION SYSTEM FOR A ROTOR

[75] Inventors: Merritt B. Andrews, Westfield, Mass.; Philip E. Barnes, West Hartford, Conn.

[73] Assignee: United Technologies Corporation, Hartford, Conn.

[22] Filed: Oct. 1, 1974

[21] Appl. No.: 510,932

[52] U.S. Cl. .............. 416/174; 416/146; 416/160
[51] Int. Cl.² .................................. B64C 11/36
[58] Field of Search ........ 416/146 A, 157, 160, 174

[56] References Cited
UNITED STATES PATENTS

| | | | |
|---|---|---|---|
| 2,891,627 | 6/1959 | Ditmer et al. | 416/157 X |
| 2,988,154 | 6/1961 | Hub | 416/174 |
| 3,301,330 | 1/1967 | Covert | 416/174 X |
| 3,325,088 | 6/1967 | Keen et al. | 416/174 X |
| 3,339,639 | 9/1967 | Elmes et al. | 416/157 |
| 3,720,060 | 3/1973 | Davies et al. | 416/157 A X |
| 3,801,219 | 4/1974 | Parsons et al. | 416/157 |
| 3,825,370 | 7/1974 | McMurtry et al. | 416/160 |
| 3,866,415 | 2/1975 | Ciokajlo | 416/157 X |
| 3,873,235 | 3/1975 | Mendelson | 416/157 X |
| 3,876,333 | 4/1975 | Ronson | 416/245 X |

FOREIGN PATENTS OR APPLICATIONS

| | | | |
|---|---|---|---|
| 26,293 | 12/1953 | Finland | 416/146 A |
| 872,780 | 5/1953 | Germany | 416/146 A |
| 136,572 | 7/1952 | Sweden | 416/146 A |

*Primary Examiner*—Everette A. Powell, Jr.
*Attorney, Agent, or Firm*—Norman Friedland

[57] ABSTRACT

Lubrication of the fan of a fan propulsor is obtained by damming the oil at judicious locations within the hub so that a centrifugal ring of oil is formed around the parts intended to be lubricated and continuously feeding a replenishing chamber and draining the excess during rotation for replenishing the oil in the dammed areas when the fan is nonrotating for achieving a controlled lubrication level.

5 Claims, 4 Drawing Figures

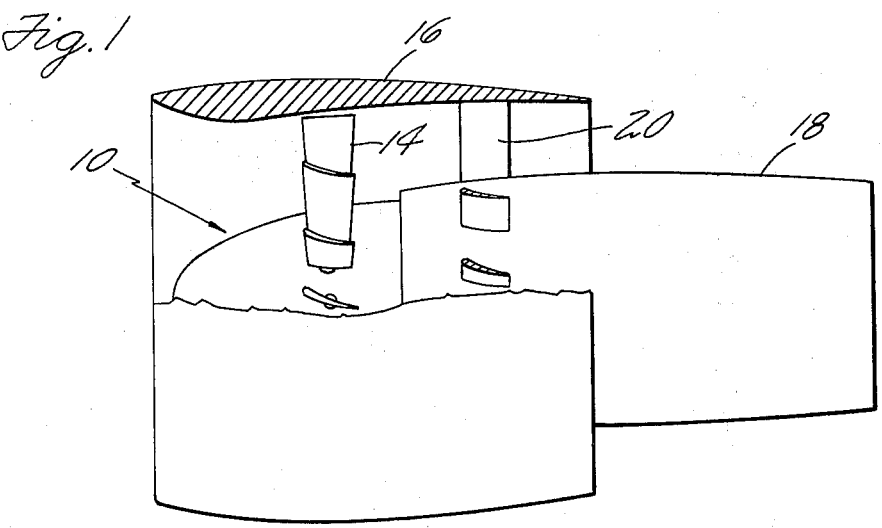
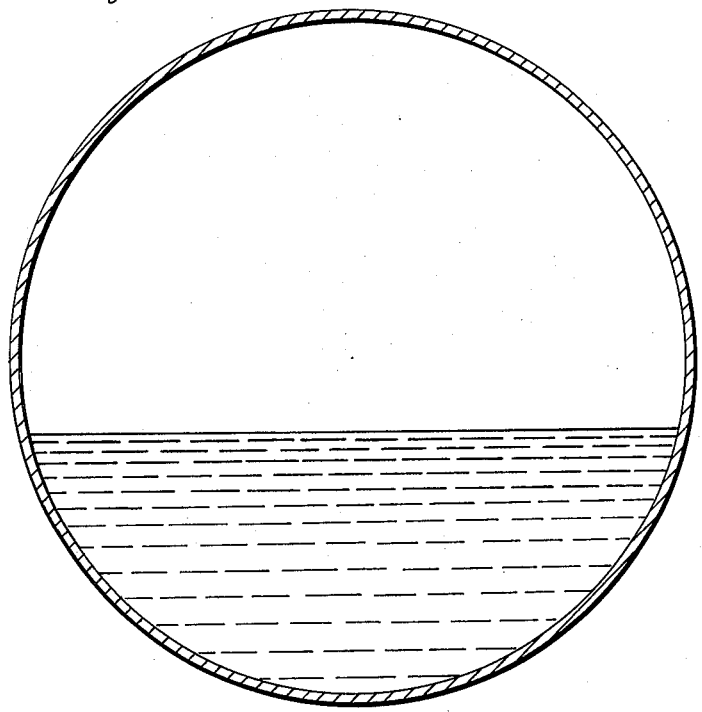
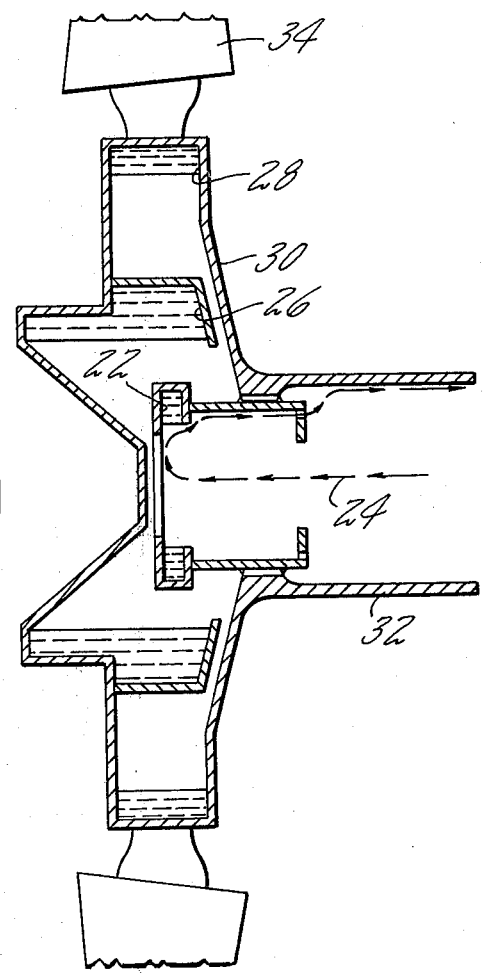

3,912,418

LUBRICATION SYSTEM FOR A ROTOR

BACKGROUND OF THE INVENTION

This invention relates to a lubrication system for the fan of a ducted fan propulsor.

A conventional method of lubricating a fan or propeller is by completely filling the hub or housing carrying the rotating assemblies. Such a system would require constant checking to assure that the oil was at the proper level. Also, by completely filling, the system virtually carries an excess of oil that adds to the weight of the assembly, which, particularly for aircraft applications is undesirable.

We have found that we can provide an improved lubricating system by flooding the area where lubrication is required, obtaining the desired oil level during rotation by damming these given flooded areas so that a centrifugal ring is formed around the parts to be lubricated, and feeding a replenishing chamber by a spray nozzle and draining the excess oil continuously during rotation so that the oil in the replenishing chamber replenishes the oil losses when rotation ceases assuring that a constant oil level is maintained. When the rotor is not rotating the oil that was held centrifugally will drop to the bottom half to the drain point level, which preferably is adjacent to the rotor drive shaft.

SUMMARY OF THE INVENTION

The object of this invention is to provide an improved lubrication system for a rotor.

The important feature of this invention is to provide, particularly for a variable pitch fan or the like that includes a rotor housing different rotating assemblies, means for continuously feeding an oil replenishing chamber and draining off the excess oil during rotation, damming the flooded areas to form an oil ring, and interconnecting the dammed areas and replenishing chamber, so that oil drops gravitationally during rotor stoppage, so that the oil from the replenishing chamber replenishes oil in the dammed area for the next rotative cycle.

Other features and advantages will be apparent from the specification and claims and from the accompanying drawings which illustrate an embodiment of the invention.

BRIEF DESCRIPTION OF THE DRAWINGS

FIG. 1 is a view schematically illustrating a ducted fan propulsor.

FIG. 2 is a schematic representation of the principles of this invention showing the nonrotation condition.

FIG. 3 is a schematic representation of the principles of this invention showing the rotating condition.

DESCRIPTION OF THE PREFERRED EMBODIMENT

Figure 4:
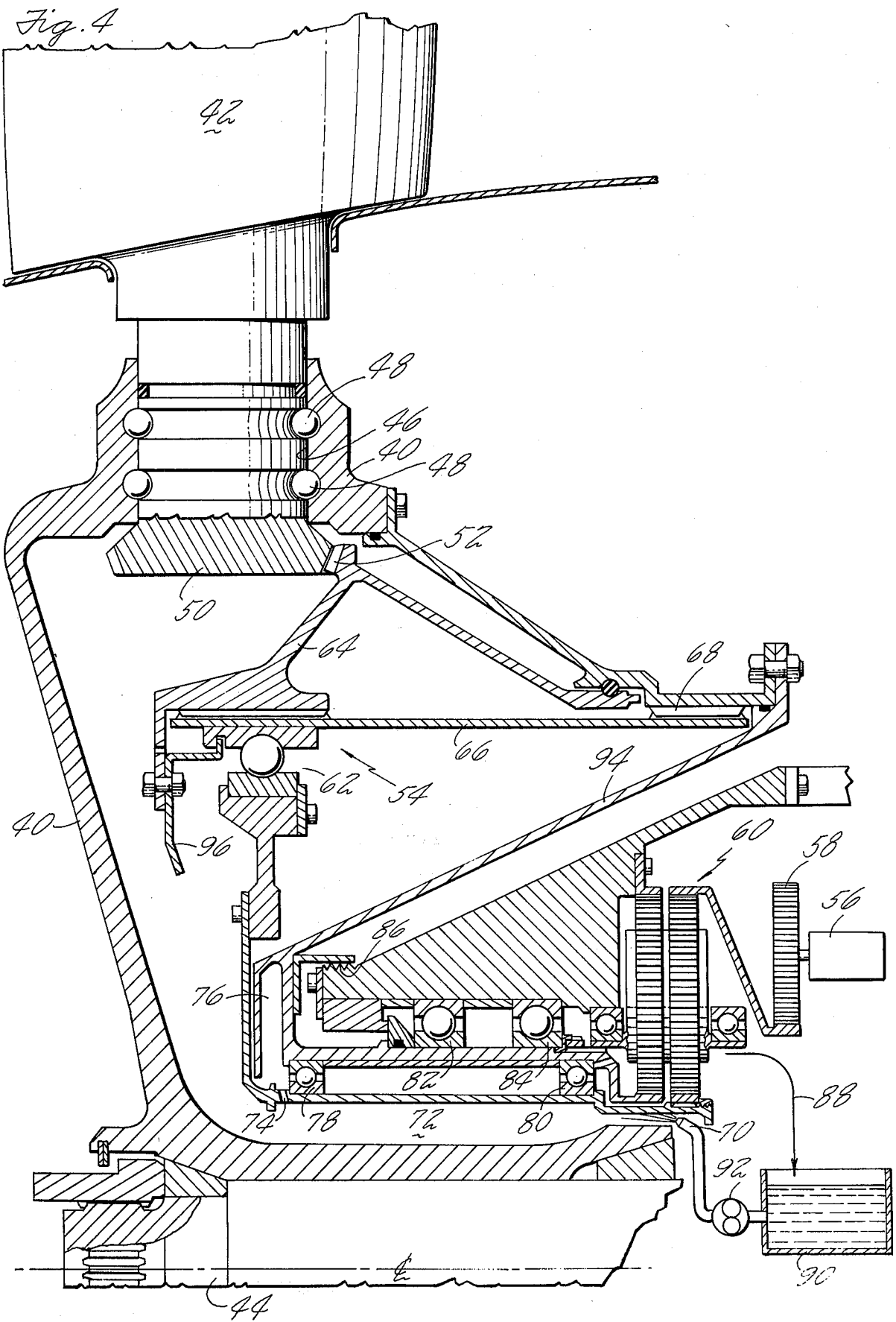
FIG. 4 is a view partly in elevation, partly in section and partly in schematic illustrating a practical application of this invention.

This invention in its preferred form is adaptable for the Q-Fan$^{TM}$ propulsor currently being developed by the Hamilton Standard Division of United Aircraft Corporation which is described in U.S. Pat. No. 3,747,343 granted to G. Rosen on July 24, 1973 and assigned to the same assignee. Suffice it to say, that a Q-Fan propulsor is a variable pitch ducted fan as shown in FIG. 1 comprising the fan rotor generally illustrated by numeral 10 supporting a plurality of variable pitch fan blades 14 within the engine bypass duct 16 supported to the turbine power plant 18 by anti-swirl vanes 20. The detailed description of the ducted fan, engine combination is omitted for the sake of convenience and simplicity but for further details reference should be made to the above referred to U.S. Pat. No. 3,747,343. While the invention is described herein with reference to the Q-Fan propulsor it should be understood as will be obvious to one skilled in the art that the invention has application for other types of rotors.

In principle, as best understood by referring to FIGS. 2 and 3, the lubrication system serves to provide oil in selected areas within the rotor radially spaced from the drive shaft by flooding these areas where parts intended to be lubricated are located and forming a dam accessible from the shaft. A replenishing chamber 22 is constantly fed oil while the rotor is in the rotating condition as schematically shown by dash lines 24. Any excess oil beyond this level will be carried back to drain which is always in communication as illustrated by dash line 24 leaving through the rearward end of the rotor. Thus, what is represented by FIG. 3 is the hub 30 driven by the engine drive shaft 32 which supports the blades 34. The dammed area 28, obviously, lubricates the bearings supporting blades 34 for pitch change movement. The dammed area 26 lubricates the pitch change actuating mechanism and the replenishing chamber 22 serves to replenish the oil losses, as will be explained hereinbelow and the flow to and out of the chamber is utilized to lubricate the bearings supporting the hub to the shaft, the drive gearing, bearings and the like. The centrifugal field in the hub serves to hold the oil in the dammed areas so that a centrifugal ring of oil is formed around these parts.

As represented by the dash arrows 24, oil is continuously fed by virtue of spray nozzles (not shown) to chamber 22 to keep it filled and the excess oil continuously drains through the rear of the hub, also represented by the dashed arrows 24. When the rotor stops rotating, the centrifugal field collapses and the oil in the top half of the hub cavity will drop to the lower half, as can be seen in FIG. 2. The volume of replenishing chamber 22 is sized to replenish the oil losses that may have occurred during the running of the rotor. It will be noted that the oil dropping from the upper portion of the chamber 22 will migrate to the bottom of the rotor faster than it can leak out, since the oil to drain is a restrictive flow path, as will be appreciated hereinbelow. Thus on restarting the oil in the bottom half will first fill the dammed areas replenishing the losses and the spray nozzles will once again fill chamber 22 until it overfills. From the foregoing it is apparent that overfilling of the rotor can never occur since all excess oil will drain. The system of topping, i.e. overfilling chamber 22, allows controlled lubrication levels in the rotor and still provides for a single remote engine oil level and fill service point.

Translating these principles to the actual hardware which is partially shown in FIG. 4 where hub 40 of the rotor supports variable pitch blade 42 (only one being shown) driven by drive shaft 44. The root 46 of blade 42 is supported for pitch change movement by the two sets of ball bearings 48 in the hub and the bevel gear 50 mates with the bevel gear 52 of the rotary actuator 54 which in this instance is a suitable harmonic drive of the type described in U.S. patent application Ser.

No. 334,334, filed on Feb. 21, 1973 by Merritt B. Andrews and assigned to the same assignee to which reference should be made for more details. The input to the harmonic drive is through actuator 56 (shown in blank and schematically) which rotates gear 58. The input, through the customary type of differential gearing 60 drives wave generator 62 causing relative motion between rigid spline 64 and flexible spline 66 grounded to hub 40 at the spline connector 68.

From the foregoing it is apparent that pitch change is effectuated in response to the input by rotating spline 64 which in turn rotates the blade 42 via gears 50 and 52. It is also apparent that the parts are so arranged to form pockets interconnected to each other by virtue of the cavity portion of the hub. Thus oil which is introduced through the spray nozzle 70 shown schematically at the differential flows through annular passage 72 through aperture 74 to fill cavity 76, lubricating the area where bearings 78, 80, 82 and 84 are located. The bearings are not flooded with oil and the oil leaking from cavity 76 must pass through a restrictive flow path before reaching the drain sump. Obviously, suitable seals, like labyrinth seal 86 are incorporated in all locations where oil may escape unwantedly. A drain line located at the rear end of the rotor provides continuous leakage path for excessive oil and is shown schematically by arrow 88 returning oil to the sump schematically shown by tank 90. Any suitable pump 92 may be employed. The area just described represents the replenishing pocket and what is shown schematicaly in FIG. 3 as chamber 22. Here oil is continuously being introduced when the rotor is in the rotary condition.

A second pocket, corresponding to chamber 26 of FIG. 3 is adjacent the harmonic drive and is defined by the housing wall 94 and the annular depending member 96. And the other pocket is defined by the hub wall and blade root, it being noted that there is communication between each of these pockets so that oil can freely migrate thereto when the rotor is not rotating.

It should be understood that the invention is not limited to the particular embodiments shown and described herein, but that various changes and modifications may be made without departing from the spirit or scope of this novel concept as defined by the following claims.

We claim:

1. A lubrication system for a rotor having a housing supporting variable pitch blades including a drive shaft driving said rotor, a pitch change actuator including elements having relative movement, support means for the blades including elements having relative movement and the drive shaft including elements having relative movement, all of said elements requiring lubrication and being disposed in said housing such that said support means, said pitch change actuator and said drive shaft are radially spaced from each other defining separate lubrication areas and all being supported in the cavity of said housing so that there is intercommunication between all of said areas so that oil can migrate from adjacent one set of elements to another set of elements when the rotor is in a nonrotating condition, a chamber in said housing for receiving oil when said rotor is rotating, drain means communicating with said chamber to exit the excess oil from said chamber and establish a relative level of oil in said cavity when said rotor is nonrotating, and oil supply means for continuously feeding oil to said chamber solely when said rotor is rotating, whereby when said rotor stops rotating the oil will gravitate to the bottom of the housing to the level established by said drain means and the oil from said chamber will also gravitate to the bottom to replenish any loss of oil.

2. A lubrication system as claimed in claim 1 wherein said chamber is formed in proximity to said drive shaft.

3. A lubricating system as claimed in claim 1 wherein the supply means leads oil from the rearward end of the rotor along the drive shaft and the drain means exit oil from the rearward end of the rotor.

4. A lubricating system as claimed in claim 1 including pump means for pumping oil from said supply means.

5. A lubrication system for a rotor having a housing supporting a plurality of blades, pitch change actuation means in said housing and driving means in said housing for rotating said rotor, said housing being generally annular in shape having the drive shaft connected centrally thereof, the blades supported at the outer periphery thereof, and the pitch change actuator disposed therebetween, wall means extending in and including said housing defining given dammed areas such that the portion supporting said blades, and the pitch change actuation means each defining a spaced annular portion where lubrication is required and where a centrifugal ring of oil is formed therein when the rotor is rotating and there being intercommunication with each dammed area so that when the rotor is nonrotating the oil in the top half of the annular housing will drop to the lower half flooding said dammed areas, drain means located substantially centrally of said housing establishing a predetermined level of oil, a replenishing chamber substantially annular in shape adjacent said driving means for continuously receiving oil when the rotor rotates and where oil is held centrifugally and drops to the bottom half of said housing replenishing any oil losses, and means for supplying oil to said replenishing chamber solely when said rotor rotates.

* * * * *